C. L. SABIN.
Butter-Package.
No. 208,695.                 Patented Oct. 8, 1878.
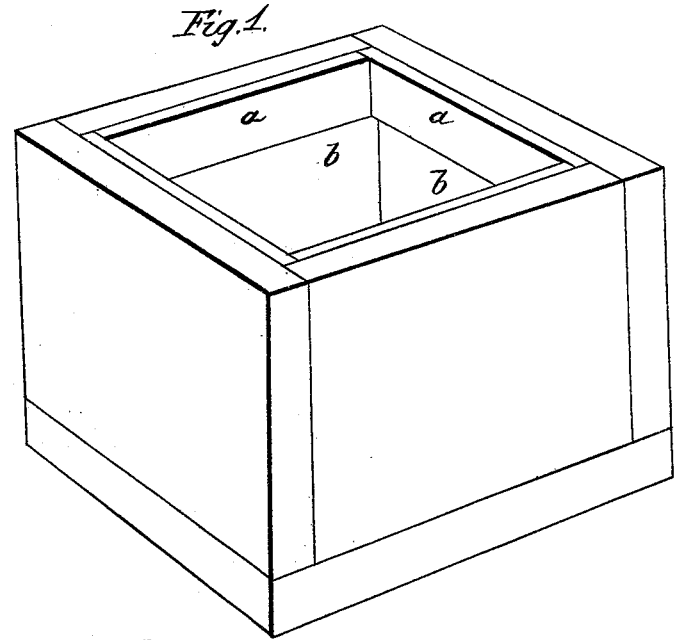
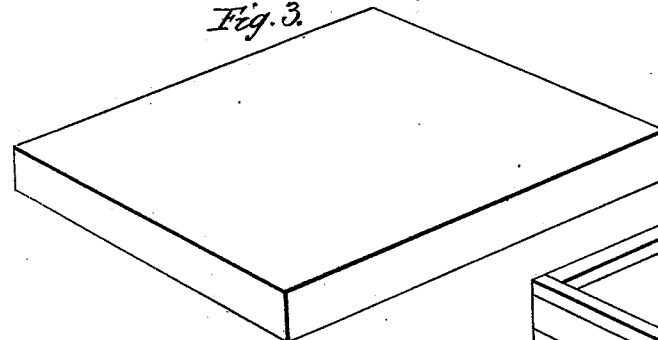
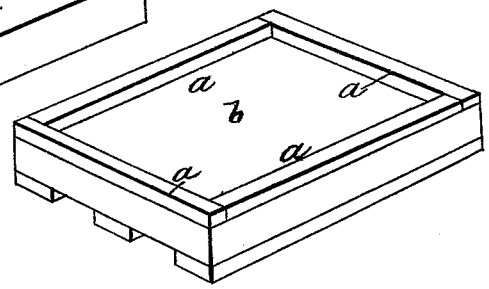
Witnesses:                                      Inventor

UNITED STATES PATENT OFFICE.

CYRUS L. SABIN, OF WASHINGTON, DISTRICT OF COLUMBIA.

IMPROVEMENT IN BUTTER-PACKAGES.

Specification forming part of Letters Patent No. 208,695, dated October 8, 1878; application filed March 20, 1878.

*To all whom it may concern:*

Be it known that I, CYRUS LAWTON SABIN, of Washington, in the District of Columbia, have invented a new and useful Improvement in Packages for Keeping and Transporting Butter, of which the following is a specification:

My invention consists in lining preserving or packing vessels with a wall or slab of solid salt, and also in a construction of a vessel so that the lining of salt will be retained in place, and also so that the butter or other substance to be preservatively packed in the vessel may be compressed into it without disturbing the lining.

Heretofore butter has been packed in the ordinary tub and firkin. This method is objectionable, for the reason that there is no certainty of the butter keeping sweet any length of time, it acquiring a woody taste from the tub, or an old one from contact with the air, either of which is disagreeable.

The object of my invention is to keep butter sweet a much greater length of time than by any means heretofore in use, by preventing the butter from coming in contact with the wood, and excluding, as nearly as possible, the air. This is attained by means of a lining or coating made of salt.

The invention consists in the construction of a box in the form of a cube, twelve and one-half inches in the clear on the inside, (or it may be of greater or less size and of different shape,) with a bead or projection around the top, on the inside, one inch wide and three-sixteenths of an inch thick, thus forming a space on all sides between the bead and bottom of the box to hold the salt lining.

The inside cover is made the proper size to go within the filling, for the purpose of closely pressing the butter in the box, so as to fill all the space and exclude the air. Around the edge on the side of this cover which goes next to the butter there is a projection of wood, one-half an inch wide and three-sixteenths of an inch thick, thus forming a space to hold the salt lining. Across the top of this cover are fastened three cleats one-half an inch thick.

The lining is made by taking fine salt (the finer the better) and wetting it with strong brine, (water may be used, but brine is best,) stirring it thoroughly to the consistency of cream, not so thick but that it will run. The box is then placed on one side in a level position, and this lining is poured over the surface to be lined until it is of the desired thickness, or about even with the projection around the top edge of the box. The box is then tapped lightly to give it a little jar, so as to cause the lining to settle evenly over the surface, keeping this side of the box in a level position until the lining becomes dry. When thoroughly dry and hard, a second side may be treated in like manner, and so on until all sides are lined or walled, including the bottom and also the inside cover. When all is thoroughly dry, it is ready for use.

When tubs are to be lined this salt lining is spread on with a knife or some other instrument.

In the accompanying drawings, in which similar letters of reference indicate like parts, Figure 1 is a perspective view of the box. Fig. 2 is a view of the inside cover. Fig. 3 is a view of the outside cover.

*a* is the bead or projection of wood around the top of the box, on the inside. *b* is the salt lining.

In Fig. 2, *a* is the bead or projection of wood around the edge of the cover. *b* is the salt lining.

When the box is filled with butter the inside cover is placed within the bead, and, by means of a lever or screw, this cover is forced down until the butter is compact. A little of the salt lining-mixture should be put into the crevice around the edge of the cover to exclude the air. Lastly, place the outside cover on in such a manner as to press upon the inside cover, and secure by means of screws or nails, and the work is done.

I do not confine myself either to a lining of salt alone, as other substances not injurious to the contents of the vessel, and, if desired, preservative, or adhesive, or impervious to air or moisture, may be mixed with the salt, or to the method of applying the lining, or to any thickness or thinness of lining. It is sufficient if a body of salt, (or salt mainly, with other material,) in a solid or immovable form, be deposited in any way as a lining to the vessel.

What I claim as my invention is—

1. A wall of solid salt as a lining to preserving-vessels, substantially as set forth.

2. The combination of a vessel-body having an inward projection around its top with a cover adapted to fit inside of the projection on the body, and having a projection, as and for the purpose set forth.

C. L. SABIN.

Witnesses:
WM. H. CHASE,
B. BREESFORD.